(12) United States Patent
Chang et al.

(10) Patent No.: US 11,155,172 B2
(45) Date of Patent: Oct. 26, 2021

(54) POWER SUPPLY SYSTEM FOR DRIVING VEHICLE

(71) Applicant: SAMSUNG SDI CO., LTD., Yongin-si (KR)

(72) Inventors: Seok Chae Chang, Yongin-si (KR); Se Ryong Oh, Yongin-si (KR); Jong Rock Choi, Yongin-si (KR); Yong Jun Tae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 50 days.

(21) Appl. No.: 16/603,432

(22) PCT Filed: Jan. 25, 2018

(86) PCT No.: PCT/KR2018/001104
§ 371 (c)(1),
(2) Date: Oct. 7, 2019

(87) PCT Pub. No.: WO2018/186573
PCT Pub. Date: Oct. 11, 2018

(65) Prior Publication Data
US 2020/0039365 A1   Feb. 6, 2020

(30) Foreign Application Priority Data

Apr. 7, 2017  (KR) .................. 10-2017-0045513

(51) Int. Cl.
*B60L 50/64* (2019.01)
*H01M 10/42* (2006.01)
(Continued)

(52) U.S. Cl.
CPC .............. *B60L 50/00* (2019.02); *B60L 50/60* (2019.02); *B60L 50/64* (2019.02);
(Continued)

(58) Field of Classification Search
CPC .......... B60L 3/0046; B60L 3/04; B60L 58/20; B60L 58/18; B60L 3/0069;
(Continued)

(56) References Cited

U.S. PATENT DOCUMENTS 8,655,535 B2   2/2014  Oh et al.
9,221,343 B2   12/2015  Tokarz et al.
(Continued)

FOREIGN PATENT DOCUMENTS

DE   102004019817 A1 *  11/2005  ............. H02H 3/202
DE   102012221486 A1 *   5/2014  ............. B60L 58/18
(Continued)

OTHER PUBLICATIONS

International Search Report for PCT/KR2018/001104 filed on Jan. 25, 2018.
(Continued)

*Primary Examiner* — Toan T Vu
*Assistant Examiner* — Elim Ortiz
(74) *Attorney, Agent, or Firm* — Lee IP Law, PC (57) ABSTRACT

The present invention discloses a power supply system capable of supplying electric power to a vehicle, in particular, an electric vehicle, while reducing the number of components and improving stability. An embodiment of the present invention discloses a power supply system comprising: a battery comprising battery cells; a first switching device formed between one electrode of the battery and a power load unit comprising a motor that receives power from the battery; a pre-charge resistor having one end electrically connected to the other electrode of the battery; and a second switching device formed between the other end of the pre-charge resistor and the other electrode of the battery.

6 Claims, 11 Drawing Sheets

(51) Int. Cl.
*H02J 7/00* (2006.01)
*B60L 50/00* (2019.01)
*B60L 50/60* (2019.01)
*B60L 53/20* (2019.01)
*B60K 6/28* (2007.10)

(52) U.S. Cl.
CPC ............ *H01M 10/425* (2013.01); *H02J 7/00* (2013.01); *B60K 6/28* (2013.01); *B60L 53/20* (2019.02); *B60Y 2200/91* (2013.01); *B60Y 2200/92* (2013.01); *H01M 2010/4271* (2013.01); *H01M 2220/20* (2013.01)

(58) Field of Classification Search
CPC ............ B60Y 2200/91; B60Y 2200/92; H02J 2207/20; H02J 7/00304; H02J 2310/48; H02J 7/02; H02J 9/002; H02J 7/0045; H02J 7/0029; H02J 7/00302; H02J 7/00306; H02J 7/00308; H02J 7/00309; H02J 7/0031; H02J 7/0032; H02J 7/0034; H02J 7/0036; Y02T 10/7072; Y02T 10/70; H02H 3/202
USPC .................... 320/163, 109; 307/9.1, 10.7
See application file for complete search history.

(56) References Cited

U.S. PATENT DOCUMENTS

| | | |
|---|---|---|
| 9,789,782 B2 | 10/2017 | Holgers et al. |
| 2013/0116875 A1 | 5/2013 | Oh et al. |
| 2013/0234675 A1* | 9/2013 | King .................... H02J 7/02 320/163 |
| 2015/0130414 A1* | 5/2015 | Izumi .................... B60L 3/0069 320/109 |
| 2015/0248979 A1 | 9/2015 | Parks et al. |
| 2016/0059712 A1 | 3/2016 | Jang |

FOREIGN PATENT DOCUMENTS

| | | |
|---|---|---|
| EP | 2543534 A1 | 1/2021 |
| KR | 10-2012-0081824 A | 7/2012 |
| KR | 10-2014-0025674 A | 3/2014 |
| KR | 10-2016-0013900 A | 2/2016 |
| KR | 10-1587358 B1 | 2/2016 |
| KR | 10-2016-0066762 A | 6/2016 |

OTHER PUBLICATIONS

Extended European Search Report dated Dec. 11, 2020 of the corresponding European Patent Application No. 18781244.1.

* cited by examiner

POWER SUPPLY SYSTEM FOR DRIVING VEHICLE

CROSS-REFERENCE TO THE RELATED APPLICATION

This is the U.S. national phase application based on PCT Application No. PCT/KR2018/001,104, filed Jan. 25, 2018, which is based on Korean Patent Application No. 10-2017-0045513, filed Apr. 7, 2017, the entire contents of all of which are hereby incorporated by reference.

TECHNICAL FIELD

The present invention relates to a power supply system capable of supplying electric power to a vehicle, in particular, an electric vehicle, while reducing the number of components and improving stability.

BACKGROUND ART

In general, a secondary battery that can be charged to be reusable is widely used as a power source for a mobile device, a hybrid vehicle, an electric vehicle, and so on. Specifically, in recent years, with growing interest in environmental issues, demand for hybrid vehicles or electric vehicles is on the rise and demand for high-output, large-capacity batteries is also growing accordingly.

Since such high-output, large-capacity batteries supply high-output power to drive a vehicle motor through a high voltage or current, safety measures have become crucial issues.

Technical Problems to be Solved

The present invention provides a power supply system capable of supplying electric power to a vehicle, in particular, an electric vehicle, while reducing the number of components and improving stability.

Technical Solutions

In accordance with an aspect of the present invention, there is provided a power supply system including a battery comprising multiple battery cells, a first switching device formed between one electrode of the battery and a power load unit comprising a motor that receives power from the battery, a pre-charge resistor having one end electrically connected to the other electrode of the battery, and a second switching device formed between the other end of the pre-charge resistor and the other electrode of the battery.

Here, the power load unit may include a power conversion capacitor connected in parallel to an input terminal, and the first switching device and the pre-charge resistor are connected to opposite ends of the power conversion capacitor.

The power supply system may further include a third switching device connected between one end of the power conversion capacitor and the other electrode of the battery.

In addition, the power supply system may further include a fourth switching device connected between the other end of the pre-charge resistor and the first switching device.

In addition, the power supply system may further include a fifth switching device connected between a contact of the first switching device and the fourth switching device and the charging unit.

In addition, the fifth switching device and the pre-charge resistor may be connected to opposite ends of the power conversion capacitor located in front of the charging unit.

In addition, the fifth switching device and the pre-charge resistor may be connected to opposite ends of the power conversion capacitor located in front of the charging unit.

In addition, the battery may further include a rupture switch connected to at least one of a mid portion between each of the battery cells, one electrode of the battery and the other electrode of the battery.

In addition, the rupture switch may include a pyrotechnic switch.

In accordance with another aspect of the present invention, there is provided a power supply system including a battery comprising multiple battery cells, a first switching device formed between one electrode of the battery and a power load unit comprising a motor that receives power from the battery, a second switching device and a pre-charge resistor connected to the first switching device in parallel, and a second switching device formed between the power load unit and the other electrode of the battery.

In addition, the power supply system may further include a fourth switching device connected between a contact of one electrode of the battery and the first switching device, and a charging unit that supplies power to the battery, and a fifth switching device connected to the fourth switching device in parallel, and another pre-charge resistor.

Advantageous Effects

As described above, the power supply system according to the present invention is configured such that the pre-charge resistor and relays are commonly used by the power load unit, the battery unit and the charging unit, thereby reducing the number of relays required to a circuit of the power supply system and simplifying the circuit configuration.

In addition, the power supply system according to the present invention includes a rupture switch comprised of a pyrotechnic switch located in at least one of mid portions of each of battery cells of the battery, thereby reducing the system size while increasing stability.

The advantageous effects of the present invention are not limited to those described above and will become apparent by reference to the following detailed description of exemplary embodiment of the present invention.

| Brief explanation of essential parts of the drawings | |
|---|---|
| 100, 200, 300: Power supply system | 110: Battery module |
| 111: Battery cell | 112: Fuse |
| 120, 140, 150, 160, 320, 330, 350, 360, 370: Switching device | |
| 420, 460, 470, 520, 550, 570: Switching device | |
| 130, 340, 380, 440: Pre-charge resistor | |
| 280, 290, 312, 430, 450, 540: Rupture switch | |
| 10: Power load unit | 11: Motor |
| 12: Inverter | 13: Power conversion capacitor |
| 14: Switching device | 15: Resistor |
| 20: Battery unit | 21: Battery for vehicle |
| 22: DC/DC Converter | 30: Charging unit |
| 31: Socket | 32: OBC set |
| 33: Power conversion capacitor | 34: Switching device |
| 35: Resistor | |

BEST MODE FOR CARRYING OUT THE INVENTION

Hereinafter, preferred embodiments of the present invention will be described in detail with reference to the accompanying drawings such that those can easily be embodied by those skilled in the art.

Figure 1:
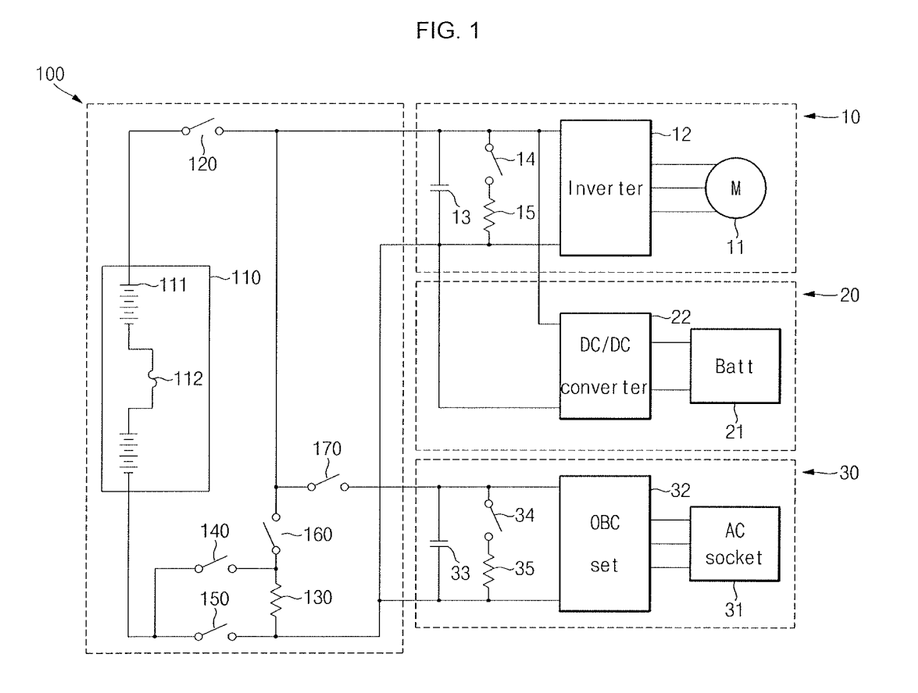
FIG. 1 is a circuit diagram showing a power supply system according to an embodiment of the present invention.

FIG. 1 is a circuit diagram showing a power supply system according to an embodiment of the present invention.

First, referring to FIG. 1, the power supply system 100 according to an embodiment of the present invention for electrically connecting a power load unit 10 of a vehicle to a battery unit 20 and a charging unit 30, includes a battery module 110, a first switching device 120, a pre-charge resistor 130, a second switching device 140, a third switching device 150, a fourth switching device 160, and a fifth switching device 170.

Here, the battery module 110 may include multiple battery cells 111 electrically connected to one another. For example, as shown, the battery cells 111 may be connected to one another in series, but may be optionally connected to one another in parallel or in series/in parallel. The battery cells 111 may be secondary batteries that can be charged and discharged. Accordingly, the battery cells 111 may be discharged to supply power to the power load unit 10 and the battery unit 20 and may be charged by receiving power from the charging unit 30.

In addition, a fuse 112 may further be provided between each of the battery cells 111. The fuse 112 provided in a current path established between the battery cells 111 may be opened when the current flowing in the battery module 110 exceeds a permissible limit. Therefore, the fuse 112 may cut off the current exceeding the permissible limit, thereby securing the safety.

One end of the first switching device 120 may be connected to one electrode, for example, a positive electrode, of the battery module 110. In addition, the other end of the first switching device 120 may be connected to the power load unit 10 and the battery unit 20. Therefore, the first switching device 120 may open or close the current path from the battery module 110 to the power load unit 10 and the battery unit 20.

The first switching device 120 may consist of a relay contact. A relay may generally include a relay coil (not shown) and a relay contact. In addition, the first switching device 120 consisting of a relay contact may be controlled to be opened or closed by applying a current to the relay coil or cutting off the current. Here, an external controller (not shown) may control charge/discharge currents, which are relatively large currents flowing in the first switching device 120, by the relatively small current flowing the relay coil, thereby safely controlling the charge/discharge currents flowing in the first switching device 120.

One end of the pre-charge resistor 130 is connected to the power load unit 10 and the charging unit 30, and the other end of the pre-charge resistor 130 is connected to the battery module 110 through the second switching device 140. The other end of the pre-charge resistor 130 is connected to a contact between the second to fourth switching devices 140 to 160. Therefore, when the battery module 110 is connected to the power load unit 10 and the charging unit 30, the pre-charge resistor 130 may provide a path for pre-charging power conversion capacitors 13 and 33 included in the power load unit 10 and the charging unit 30, respectively.

One end of the second switching device 140 is connected between the pre-charge resistor 130 and the fourth switching device 160, and the other end of the second switching device 140 is connected to the other electrode, for example, a negative electrode, of the battery module 110. The second switching device 140 may also consist of a relay contact connected to a relay coil (not shown).

The second switching device 140 is maintained in an opened state at normal times and is closed during pre-charging of the power conversion capacitors 13 and 33 of the power load unit 10 and the charging unit 30. Accordingly, as will later be described, the power conversion capacitors 13 and 33 may be pre-charged.

The third switching device 150 is connected between each of the power load unit 10, the battery unit 20 and the charging unit 30 and the other electrode of the battery module 110. The third switching device 150 may also consist of a relay contact connected to a relay coil (not shown).

The third switching device 150 opens or closes a discharge path for applying power from the battery module 110 to the power load unit 10 and the battery unit 20 and a charge path for charging the battery module 110 with power from the charging unit 30. That is to say, when the third switching device 150 is closed, the discharge path or the charge path is connected.

The fourth switching device 160 is connected between a contact of the first switching device 120 and the fifth switching device 170 and a contact of the pre-charge resistor 130 and the second switching device 140. The fourth switching device 160 may also consist of a relay contact connected to a relay coil (not shown).

The fourth switching device 160 may be connected to discharge the power conversion capacitors 13 and 33 of the power load unit 10 and the charging unit 30. That is to say, if the fourth switching device 160 is closed and the first to third switching devices 120, 140 and 150 are opened, the power conversion capacitors 13 and 33 of the power load unit 10 and the charging unit 30 may be selectively connected to the pre-charge resistor 130 to establish a closed loop, thereby performing a discharge operation.

The fifth switching device 170 is connected between a contact point of the first switching device 120 and the fourth switching device 160, and the charging unit 30. The fifth switching device 170 may also consist of a relay contact connected to a relay coil (not shown).

If the fifth switching device 170 is closed, a current path for the charging unit 30 is established, thereby charging the power conversion capacitor 33 provided in the charging unit 30 or applying power from the charging unit 30 to the battery module 110 to charge the battery module 110.

As described above, the power supply system 100 according to an embodiment of the present invention is configured such that the pre-charge resistor 130 and the relays 120 and 140 to 170 are commonly used by the power load unit 10, the battery unit 20 and the charging unit 30, thereby reducing the number of relays required to a circuit of the power supply system 100 and simplifying the circuit configuration.

Hereinafter, operations of the power supply system according to an embodiment of the present invention will be described in more detail.

Figure 2:
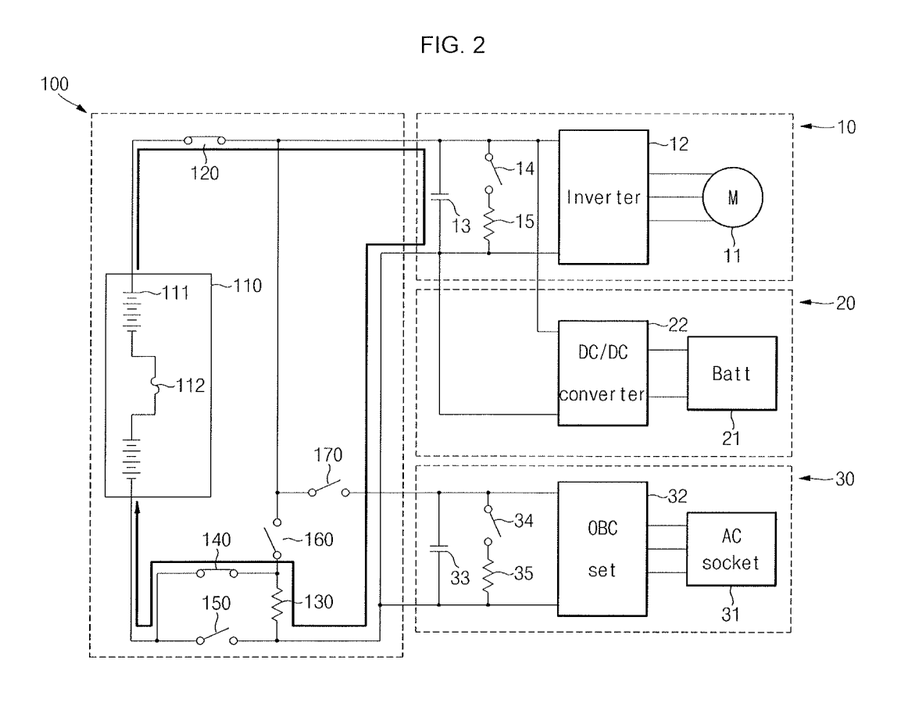
FIG. 2 is a circuit diagram for explaining a pre-charge operation for applying power to a vehicle motor and a battery in the power supply system according to an embodiment of the present invention.

FIG. 2 is a circuit diagram for explaining a pre-charge operation for applying power to a vehicle motor and a battery in the power supply system according to an embodiment of the present invention.

Referring to FIG. 2, the power supply system 100 according to an embodiment of the present invention may operate to close the first switching device 120 and the second switching device 140 and to open the other switching devices 150, 160 and 170. In this case, as shown in FIG. 2, the battery module 110 is connected to the power conversion capacitor 13 of the power load unit 10 to supply power for pre-charging.

In more detail, a current path is established, the current path ranging from one electrode, for example, a positive electrode, of the battery module 110 to the other electrode, for example, a negative electrode, of the battery module 110 through the first switching device 120, the power conversion capacitor 13 of the power load unit 10, the pre-charge resistor 130, and the second switching device 140.

The power conversion capacitor 13 provided in the power load unit 10 may be pre-charged through the battery module 110. Therefore, when the power load unit 10 and the battery unit 20 are connected, electrical shocks applied to various elements of the battery module 110, the power load unit 10 and the battery unit 20 can be prevented.

Figure 3:
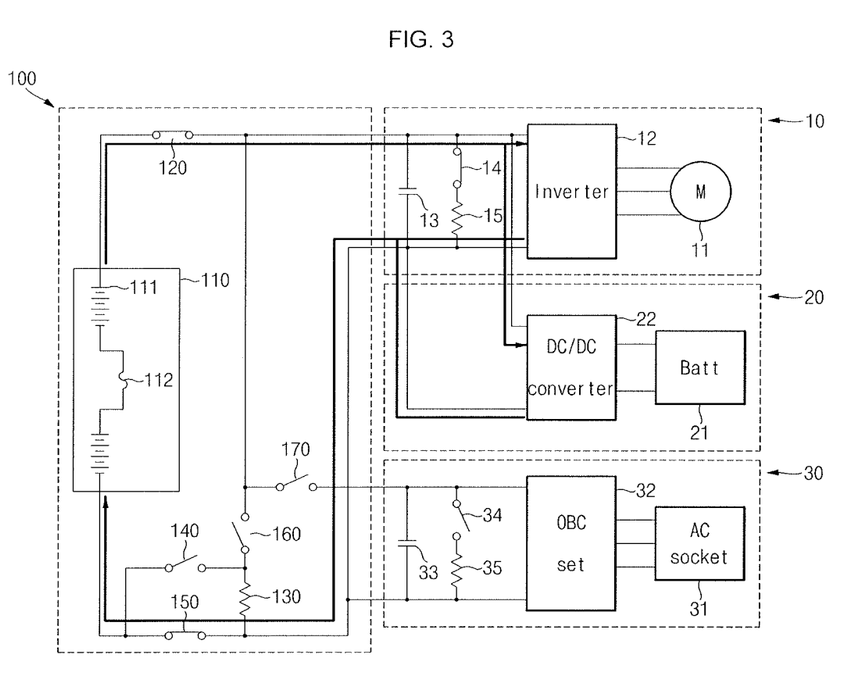
FIG. 3 is a circuit diagram for explaining a pre-charge operation for applying power to a vehicle motor and a battery in the power supply system according to an embodiment of the present invention.

FIG. 3 is a circuit diagram for explaining a pre-charge operation for applying power to a vehicle motor and a battery in the power supply system according to an embodiment of the present invention.

Next, referring to FIG. 3, the power supply system 100 according to an embodiment of the present invention may operate to close the first switching device 120 and third switching device 150 and to open the other switching devices 140, 160 and 170. In this case, as shown in FIG. 3, the battery module 110 is connected to the power load unit 10.

In addition, the switching device 14 provided in the power load unit 10 is closed to connect a resistor 15 having a relatively large resistance value to the power conversion capacitor 13 in parallel, thereby supplying a current to the inverter 12.

According to the operation mechanism, the power of the battery module 110 may be transmitted to a motor 11 provided in the power load unit 10. Of course, the inverter 12 may be provided in front of the motor 11 to have a voltage and a phase applied to the motor 11.

In addition, the current from the battery module 110 may also be supplied to a DC-DC converter 22 of the battery unit 20 connected to the inverter 12 in parallel, and a vehicle battery 21 provided in the battery unit 20 may also be charged. Here, the vehicle battery 21 may generally consist of a 12 V battery.

Figure 4:
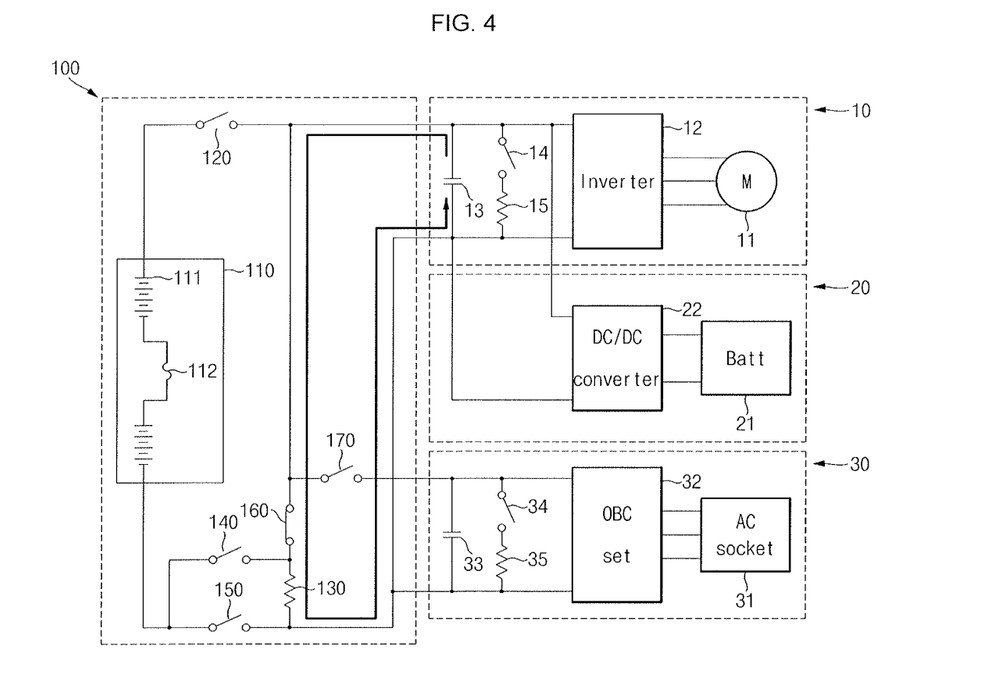
FIG. 4 is a circuit diagram for explaining a discharge operation for disconnecting a battery of a vehicle motor in the power supply system according to an embodiment of the present invention.

FIG. 4 is a circuit diagram for explaining a discharge operation for disconnecting a battery of a vehicle motor in the power supply system according to an embodiment of the present invention.

Next, referring to FIG. 4, the power supply system 100 according to an embodiment of the present invention may operate to open the first switching device 120, the second switching device 140, the third switching device 150, and the fifth switching device 170 and to close only the fourth switching device 140.

Accordingly, the power conversion capacitor 13 may establish a closed loop connected to the pre-charge resistor 130 through the fourth switching device 140, thereby performing a discharge operation.

Therefore, the power charged in the power conversion capacitor 13 may be consumed up to prevent the power from being applied to the motor 11 of the power load unit 10 and to prevent electrical shocks from being applied to various elements when the power load unit 10 is disconnected from the battery module 110.

Figure 5:
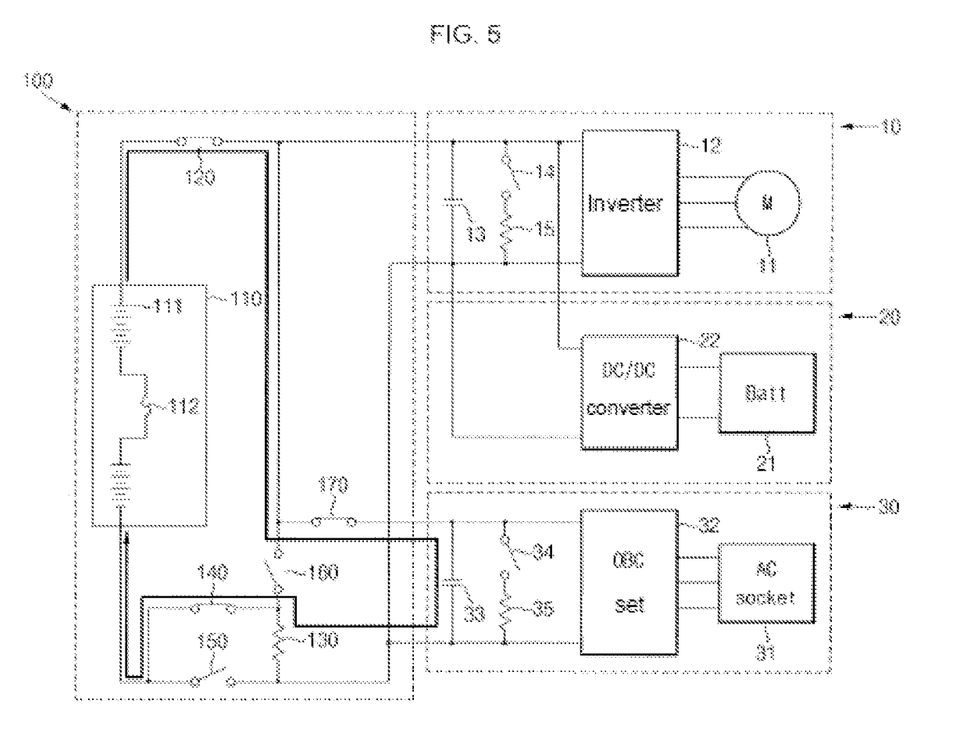
FIG. 5 is a circuit diagram for explaining a pre-charge operation for charging a battery in the power supply system according to an embodiment of the present invention from an AC socket.

FIG. 5 is a circuit diagram for explaining a pre-charge operation for charging a battery in the power supply system according to an embodiment of the present invention from an AC socket.

Referring to FIG. 5, the power supply system 100 according to an embodiment of the present invention may operate to close the first switching device 120, the second switching device 140 and the fifth switching device 170 and to open the third switching device 150 and the fourth switching device 160.

Accordingly, the battery module 110 may establish a closed loop including the first switching device 120, the fifth switching device 170, the power conversion capacitor 33 of the charging unit 30, the pre-charge resistor 130 and the second switching device 140.

Here, the current may also flow in the power conversion capacitor 13 of the power load unit 10. However, the switching device 14 of the power load unit 10 is closed, thereby preventing the current from flowing in the power load unit 10.

Accordingly, the power conversion capacitor 33 of the charging unit 30 may receive the power from the battery module 110 to be pre-charged, thereby preventing electrical shocks from being applied to various elements of the battery module 110 and the charging unit 30 when the charging unit 30 is connected to the battery module 110.

Figure 6:
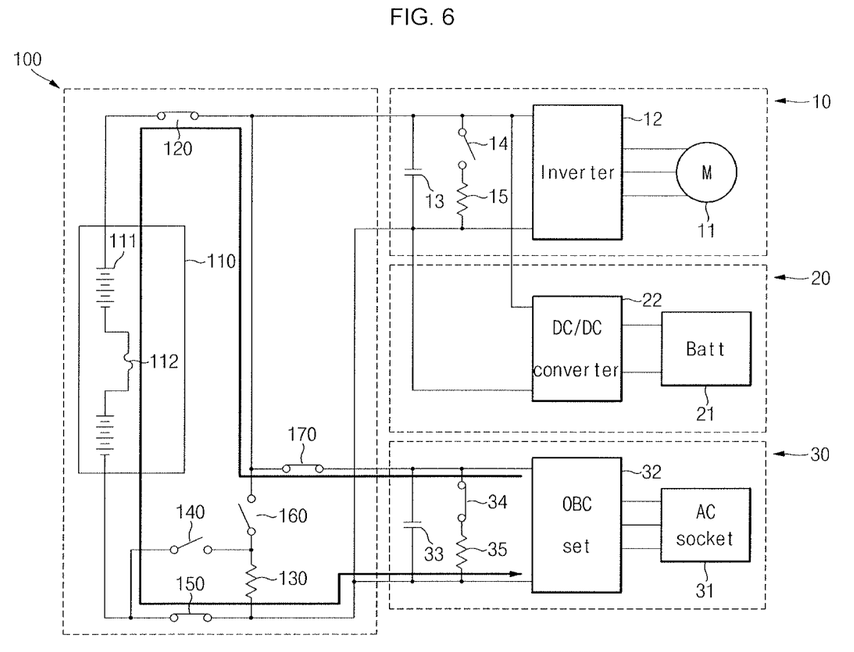
FIG. 6 is a circuit diagram for explaining an operation for charging a battery in the power supply system according to an embodiment of the present invention from an AC socket.

FIG. 6 is a circuit diagram for explaining an operation for charging a battery in the power supply system according to an embodiment of the present invention from an AC socket.

Referring to FIG. 6, the power supply system 100 according to an embodiment of the present invention may operate to close the first switching device 120, the third switching device 150 and the fifth switching device 170 and to operate the other switching devices 140 and 160.

Accordingly, the battery module 110 may establish a closed loop with the first switching device 120, the fifth switching device 170, the charging unit 30, and the third switching device 150.

Therefore, the power applied through an OBC set 32 from an external power source (not shown) coupled to the socket 31 positioned in the charging unit 30 may be transmitted to the battery module 110 to charge the battery module 110.

In addition, the switching device 34 provided in the charging unit 30 may be closed to connect a resistor 35 having a relatively large resistance value to the power conversion capacitor 33 in parallel, thereby applying the current from the charging unit 30 to the battery module 110.

Figure 7:
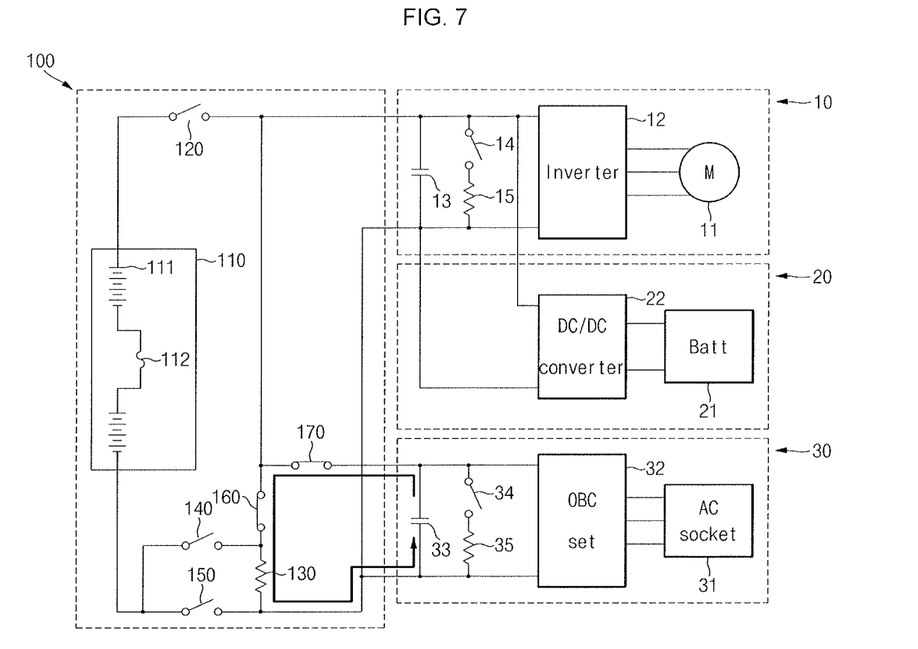
FIG. 7 is a circuit diagram for explaining a discharge operation for disconnecting a battery in the power supply system according to an embodiment of the present invention from an AC socket.

FIG. 7 is a circuit diagram for explaining a discharge operation for disconnecting a battery in the power supply system according to an embodiment of the present invention from an AC socket.

Next, referring to FIG. 7, the power supply system 100 according to an embodiment of the present invention may operate to close the fourth switching device 160 and the fifth switching device 170 and to open the first to third switching devices 110, 140 and 150.

Accordingly, the power conversion capacitor 33 provided in the charging unit 30 may establish a closed loop with the fourth switching device 160, the fifth switching device 170 and the pre-charge resistor 130, and the power stored in the power conversion capacitor 33 may be consumed up in the pre-charge resistor 130. Therefore, the power conversion capacitor 33 may be discharged, thereby preventing electrical shocks from being applied to various elements when the battery module 110 is disconnected from the charging unit 30.

Therefore, with the circuit configuration, the power supply system 100 according to an embodiment of the present invention may be configured such that the power conversion capacitor 13 of the power load unit 10 performs a pre-charge or discharge operation, thereby preventing the power from the battery module 110 from being applied to the power load unit 10 and the battery unit 20 when the battery module 110 and the charging unit 30 are connected to each other or disconnected from each other.

In addition, the power supply system 100 according to an embodiment of the present invention may also be configured such that the power conversion capacitor 33 of the charging unit 30 performs a pre-charge or discharge operation, thereby preventing electrical impacts from being applied to various elements when the battery module 110 and the charging unit 30 are connected to each other or disconnected from each other.

Hereinafter, a power supply system according to another embodiment of the present invention will be described.

Figure 8:
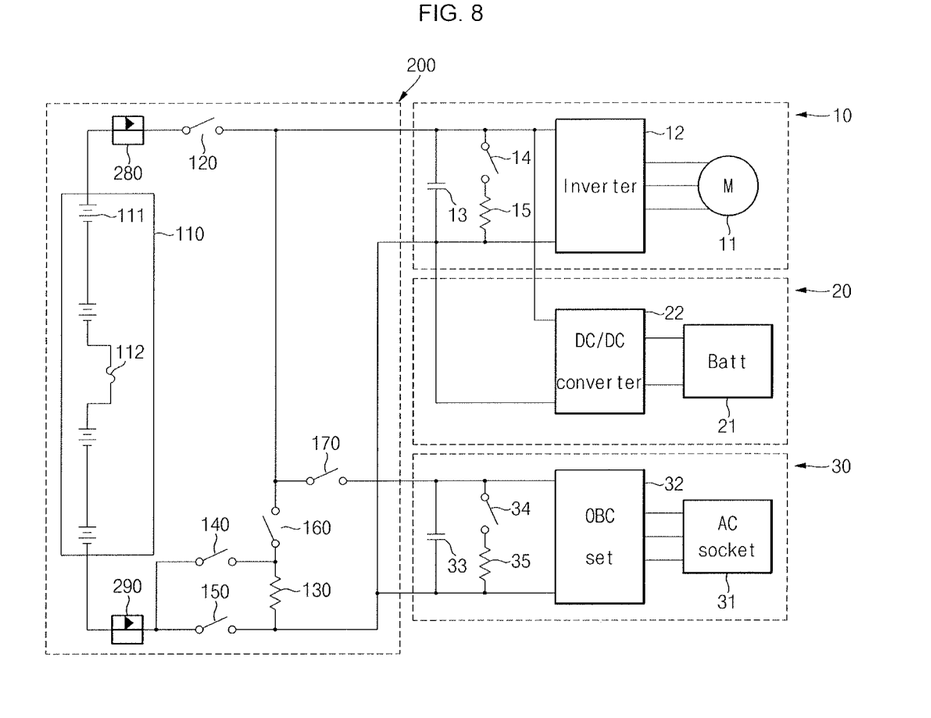
FIG. 8 is a circuit diagram showing a power supply system according to another embodiment of the present invention.

FIG. 8 is a circuit diagram showing a power supply system according to another embodiment of the present invention.

Referring to FIG. 8, the power supply system 200 according to another embodiment of the present invention may further include rupture switches 280 and 290 connected between one electrode of the battery module 110 and the first switching device 120, the other electrode of the battery module 110 and a contact between the second switching device 140 and the third switching device 150.

The rupture switches 280 and 290 may substitute for conventional fuses and may consist of pyrotechnic switches. The rupture switches 280 and 290 may be configured to be ruptured when the current exceeds a predetermined level, thereby cutting off the current from the battery module 110. In addition, the rupture switches 280 and 290 as substitutes for conventional fuses may have reduced sizes and operational stability can be secured.

Hereinafter, a power supply system according to still another embodiment of the present invention will be described.

Figure 9:
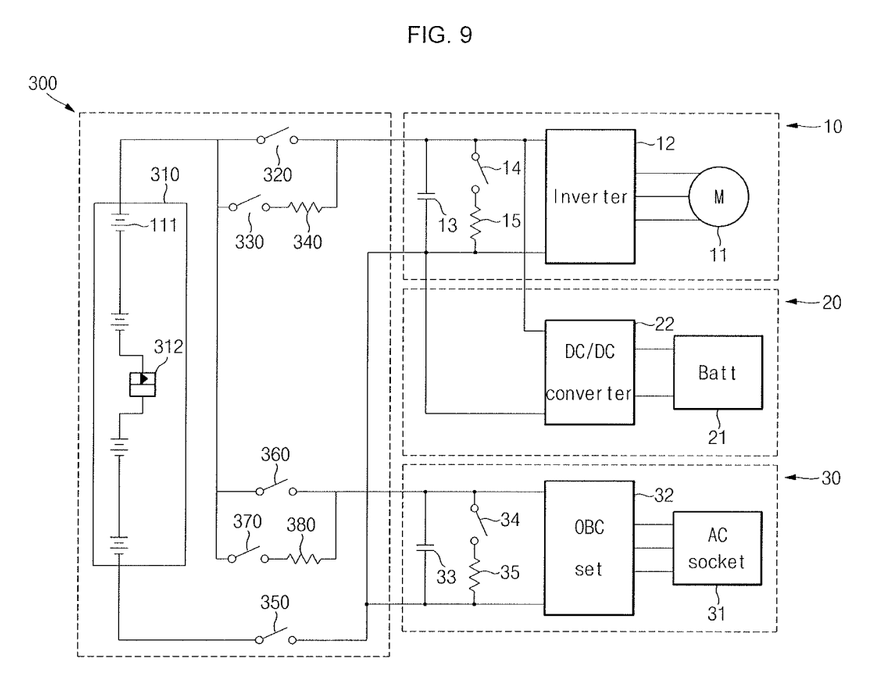
FIG. 9 is a circuit diagram showing a power supply system according to still another embodiment of the present invention.

FIG. 9 is a circuit diagram showing a power supply system according to still another embodiment of the present invention.

Referring to FIG. 9, the power supply system 300 according to an embodiment of the present invention may include a rupture switch 312 located between each of battery cells 111 in the battery 310.

The rupture switch 312 may also consist of a pyrotechnic switch and may prevent overcurrent from flowing in the battery 310. In addition, the rupture switch 312 may stably operate as a substitute for the conventional fuse while reducing the size.

In addition, the power supply system 300 according to an embodiment of the present invention may include a first switching device 320, a second switching device 330, a pre-charge resistor 340, and a third switching device 350, which are connected from the battery module 110 to the power load unit 10 and the battery unit 20.

Here, the first switching device 320 may be connected to the second switching device 330 and the pre-charge resistor 340 in parallel. In addition, when the pre-charge resistor 13 is connected, the second switching device 330 and the third switching device 350 are closed, and when the motor 11 or the vehicle battery 21 is connected, the first switching device 320 and the third switching device 350 are closed, thereby performing the overall operations of the power load unit 10 and the battery unit 20, including pre-charging of the power conversion capacitor 13.

In addition, the power supply system 300 according to an embodiment of the present invention may include a fourth switching device 360, a fifth switching device 370 and a pre-charge resistor 380, which are connected from the battery module 110 to the charging unit 30.

Here, the fourth switching device 360 may also be connected to the fifth switching device 370 and the pre-charge resistor 380 in parallel. In addition, the fourth switching device 360 and the fifth switching device 370 may be opened or closed in the same manner as the first switching device 320 and the second switching device 330, thereby performing the overall operation of the charging unit 30, including pre-charging of the power conversion capacitor 33.

Hereinafter, a power supply system according to still another embodiment of the present invention will be described.

Figure 10:
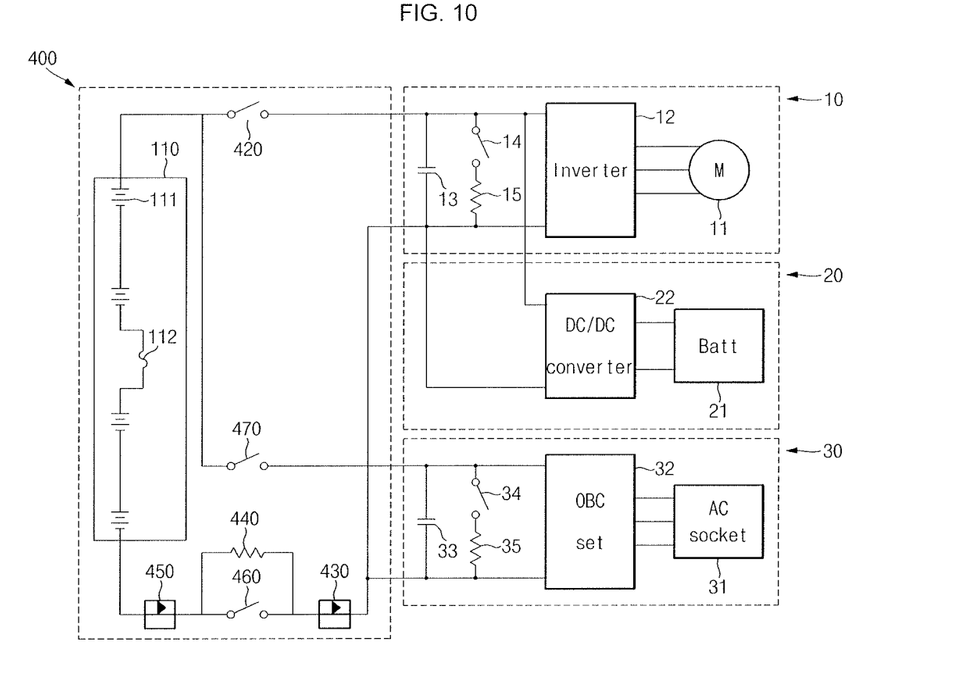
FIG. 10 is a circuit diagram showing a power supply system according to still another embodiment of the present invention.

FIG. 10 is a circuit diagram showing a power supply system according to still another embodiment of the present invention.

Referring to FIG. 10, the power supply system 400 according to an embodiment of the present invention may include a first switching device 420, a second switching device 460, and a pre-charge resistor 440, which are connected to the power load unit 10 and the battery unit 20. In addition, the power supply system 400 according to an embodiment of the present invention may further include rupture switches 430 and 450 located at opposite ends of the second switching device 460.

Here, the first switching device 420 and the pre-charge resistor 440 are connected to the power load unit 10, thereby applying power to the motor 11 through the inverter 12 while pre-charging the power conversion capacitor 13. In this case, since the voltages applied to the power conversion capacitor 13 and the inverter 12 are smaller than the voltage of the battery module 110 by the pre-charge resistor 440, electrical shocks can be prevented when the power load unit 10 is connected.

In addition, after the pre-charging, the second switching device 460 is connected to apply the power from the battery module 110 to the inverter 12 and the motor 11.

In addition, the power supply system 400 according to an embodiment of the present invention may further include a third switching device 470 connected to the charging unit 30.

The third switching device 470 may operate in the same manner as the first switching device 420 to allow the charging unit 30 to supply power to the battery module 110.

Hereinafter, a power supply system according to still another embodiment of the present invention will be described.

Figure 11:
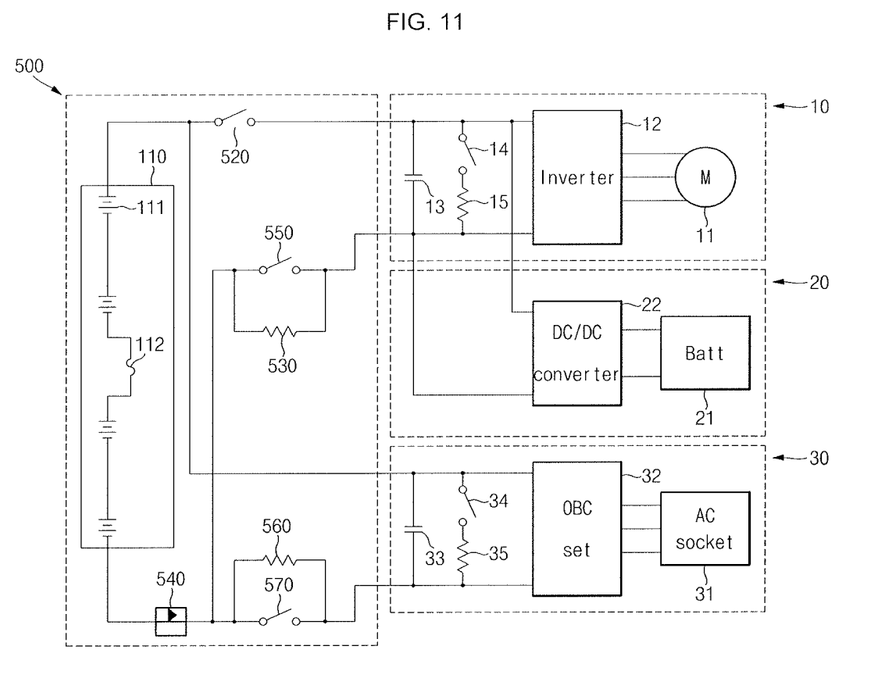
FIG. 11 is a circuit diagram showing a power supply system according to still another embodiment of the present invention.

FIG. 11 is a circuit diagram showing a power supply system according to still another embodiment of the present invention.

Referring to FIG. 11, the power supply system 500 according to an embodiment of the present invention may include a first switching circuit 520 commonly connected between one electrode, for example, a positive electrode, of the battery module 110 and each of the power load unit 10, the battery unit 20 and the charging unit 30. In addition, the power supply system 500 according to an embodiment of the present invention may include a pre-charge resistor 530 and a second switching device 550, which are connected between each of the power load unit 10, the battery unit 20 and the other electrode, for example, a negative electrode, of the battery module 110. Here, the pre-charge resistor 530 may establish a path for pre-charging the power conversion capacitor 13 of the power load unit 10, and paths for supplying power to the inverter 12 and the motor 11 when the second switching device 550 is closed.

In addition, the power supply system 500 according to an embodiment of the present invention may include a pre-charge resistor 560 and a third switching device 570, connected between the power load unit 30 and the other electrode, for example, a negative electrode, of the battery module 110.

Here, the pre-charge resistor 560 and the third switching device 570 may operate in the same manner as the pre-charge resistor 530 and the second switching device 530, respectively, to establish a path connecting the charging unit 30 to the battery module 110.

In addition, a rupture switch 540 may further be provided in front of the other electrode, for example, the negative electrode, of the battery module 110, operating as a fuse, thereby increasing the safety while reducing the size.

While the power supply system of the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A power supply system, comprising:
a battery including multiple battery cells;
a first switching device connected between a first electrode of the battery and a power load unit including a motor that receives power from the battery;
a pre-charge resistor having a first end electrically connected to a second electrode of the battery;
a second switching device connected between a second end of the pre-charge resistor and the second electrode of the battery;
a fourth switching device connected between the second end of the pre-charge resistor and the first switching device; and
a fifth switching device connected between a charging unit and a point between the first switching device and the fourth switching device, wherein:
the power load unit includes a first power conversion capacitor connected in parallel to input terminals of the power load unit, and
the first switching device and the pre-charge resistor are connected to opposite ends of the first power conversion capacitor.

2. The power supply system of claim 1, further comprising a third switching device connected between a first end of the first power conversion capacitor and the second electrode of the battery.

3. The power supply system of claim 1, wherein the fifth switching device and the pre-charge resistor are connected to opposite ends of a second power conversion capacitor located in front of the charging unit.

4. The power supply system of claim 1, wherein the battery further includes a rupture switch connected to at least one of a mid portion between each of the battery cells, the first electrode of the battery and the second electrode of the battery.

5. The power supply system of claim 4, wherein the rupture switch includes a pyrotechnic switch.

6. A power supply system, comprising:
a battery including multiple battery cells;
a first switching device connected between a first electrode of the battery and a power load unit including a motor that receives power from the battery;
a second switching device and a first pre-charge resistor connected to the first switching device in parallel;
a third switching device connected between the power load unit and a second electrode of the battery, and connected between a charging unit, which supplies power to the battery, and the second electrode of the battery;
a fourth switching device connected between the charging unit and a point between the first electrode of the battery and the first switching device; and
a fifth switching device and a second pre-charge resistor connected to the fourth switching device in parallel.

* * * * *